United States Patent [19]
Perkowitz et al.

[11] Patent Number: 6,138,128
[45] Date of Patent: Oct. 24, 2000

[54] SHARING AND ORGANIZING WORLD WIDE WEB REFERENCES USING DISTINCTIVE CHARACTERS

[75] Inventors: Michael Perkowitz, Seattle; John E. Ball, Woodinville, both of Wash.

[73] Assignee: Microsoft Corp., Redmond, Wash.

[21] Appl. No.: 08/825,867

[22] Filed: Apr. 2, 1997

[51] Int. Cl.[7] .................................................. G06F 15/00
[52] U.S. Cl. .................. 707/501; 707/513; 707/514; 709/224; 709/225; 709/203
[58] Field of Search .................... 707/501, 513, 707/514, 104, 10; 345/326, 327, 328, 329, 335; 395/346, 200.57, 200.48, 200.31, 200.33, 200.54, 200.53, 200.55; 709/224, 225, 203

[56] References Cited

U.S. PATENT DOCUMENTS

| | | | |
|---|---|---|---|
| 5,594,897 | 1/1997 | Goffman | 707/102 |
| 5,708,825 | 1/1998 | Sotomayor | 707/501 |
| 5,729,637 | 3/1998 | Nicholson et al. | 382/282 |
| 5,742,816 | 4/1998 | Barr et al. | 395/615 |
| 5,754,938 | 5/1998 | Herz et al. | 455/4.2 |
| 5,754,939 | 5/1998 | Herz et al. | 455/4.2 |
| 5,796,393 | 8/1998 | MacNaughton et al. | 345/329 |
| 5,809,247 | 9/1998 | Richardson et al. | 395/200.48 |
| 5,826,031 | 10/1998 | Nielsen | 395/200.63 |
| 5,832,494 | 11/1998 | Egger et al. | 707/102 |
| 5,835,087 | 11/1998 | Herz et al. | 345/327 |
| 5,835,712 | 11/1998 | DuFresne | 395/200.33 |
| 5,835,905 | 11/1998 | Pirolli et al. | 707/3 |
| 5,854,630 | 12/1998 | Nielsen | 345/352 |
| 5,884,035 | 3/1999 | Butman et al. | 395/200.48 |
| 5,890,152 | 3/1999 | Rapaport et al. | 707/6 |

OTHER PUBLICATIONS

Resnick, Paul and Hal R. Varian, "Recommender Systems," Communications of the ACM, vol. 40, No. 3, Mar., 1997, pp. 56–58.

Terveen, Loren et al., "PHOAKS: A System for Sharing Recommendations," Communications of the ACM, vol. 40, No. 3, Mar., 1997, pp. 59–62.

Kautz, Henry et al., "Referral Web: Combining Social networks and Collaborative Filtering," Communications of the ACM, vol. 40, No. 3, Mar., 1997, pp. 63–65.

Balabanovic, Marko and Yoav Shoham, "Fab: Content–Based Collaborative Recommendation," Communications of the ACM, vol. 40, No. 3, Mar., 1997, pp. 66–72.

Rucker, James and Marcos J. Polanco, "Siteseer: Personalized Navigation for the Web," Communications of the ACM, vol. 40, No. 3, Mar., 1997, pp. 73–75.

Konstan, Joseph A. et al., "GroupLens: Applying Collaborative Filtering to Usenet News," Communications of the ACM, vol. 40, No. 3, Mar., 1997, pp. 77–87.

Rich, Elaine, "Building and Exploiting User Models," Ph.D. Thesis, Carnegie–Mellon University, Computer Science Department, 1979, pp. 1–193.

Matt Wright, Random Link, http://www.scriptarchive.com/scripts/, Jul. 30, 1995.

Mark R. Brown, Using Netscape 2, p. 157, 1995.

Brown, Using Netscape 2, Que Corporation, pp. 694, 695, 1995.

*Primary Examiner*—Stephen S. Hong
*Assistant Examiner*—Cong-Lac Huynh
*Attorney, Agent, or Firm*—Law Offices of Michael Dryja

[57] ABSTRACT

The present invention is directed to sharing and organizing world wide web pages using a number of distinctive characters, each having an interest. In a preferred embodiment, each distinctive character is initialized by associating with it one or more web pages that collectively characterize the interest of the character. After initialization, each web page viewed by the user is assessed for each of the distinctive characters. The assessment process involves, for a single distinctive character, determining whether the web page viewed by the user exhibits at least a threshold level of similarity to web pages already associated with the distinctive character. The assessment process further involves associating the viewed web page with the distinctive character if the viewed web page exhibits at least a threshold level of similarity to the web pages already associated with the distinctive character. As a result, after the user has viewed a number of web pages, the viewed web pages that characterize each distinctive character's interest are associated with that distinctive character.

17 Claims, 8 Drawing Sheets

SHARING AND ORGANIZING WORLD WIDE WEB REFERENCES USING DISTINCTIVE CHARACTERS

TECHNICAL FIELD

The present invention relates to computer systems, and, in particular, tools for sharing and organizing world wide web references for browsing.

BACKGROUND OF THE INVENTION

The world wide web ("the web") is a very large body of information maintained on thousands of computer systems connected by the Internet. The web is organized into millions of documents called web pages. A group of related web pages produced and maintained by the same person or organization is known as a "web site." Each web page may be independently accessed by providing a reference to the web page, called a "URL," or "uniform resource locator," to a web client application, called a "browser," executing on the user's computer system, or the "client" computer system. The browser uses DNS (Domain Naming System) resources to identify from the URL the particular computer system on which the web page is stored, known as the "server" of the web page, and sends a request for the contents of the web page to that computer system. When the server returns the contents of the web page in response to the request, the browser displays them to the user. This process is known as "viewing," "visiting," or "presenting" the web page.

Figure 1:
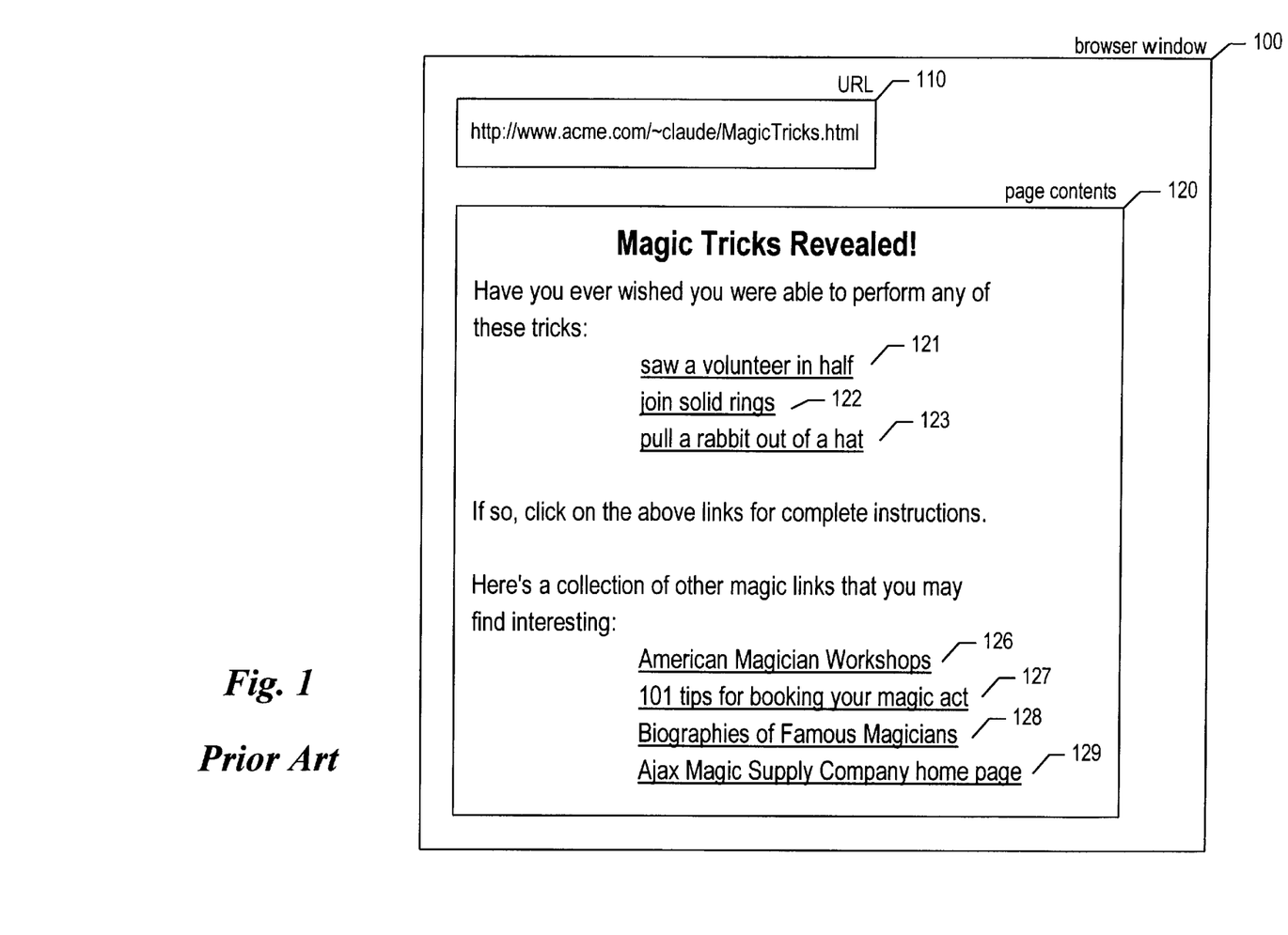
FIG. 1 is a screen diagram showing a sample web page.

Web page contents can include data such as text, still images, and audio and video clips; programs executable on the client machine; and links to related web pages. Many web pages provide useful information. For example, FIG. 1 is a screen diagram showing a sample web page that might be useful to users interested in magic as a hobby. The screen diagram shows a browser window 100 displayed by a browser. The browser window contains a web page reference field 110, into which the user may type or otherwise transfer a URL for a web page that the user wishes to view. When the user does so, the browser retrieves the contents of the referenced web page and displays them in a web page contents window 120. The web page whose contents are being displayed in the web page contents window 120 is called the "current web page." The contents displayed in the web page contents window 120 include a number of hypertext links, such as links 121–123 and 126–129. Each hypertext link is associated with a URL that typically identifies a web page. The user may select any of these hypertext links to display the contents of a web page corresponding to the link. When a user selects a hypertext link, the browser retrieves the web page identified by the URL and displays that web page in the web page contents window. The browser also updates the web page reference field to contain the URL for the retrieved web page. The web page thus displayed is said to be "referenced" by the selected link.

Because of the sheer size of the web, users can often eventually find several pages that are interesting to them. The considerable task of identifying such pages from among millions of others, however, can engender frustration and disappointment. In order to help users more easily find web pages that are interesting to them, several web sites have provided world wide web search engines and indices. Search engines identify web pages containing words, called "search terms," specified by the user. For instance, a user interested in the magic trick in which a volunteer is sawed in half might specify the search terms "magic" and "saw," to identify web pages containing those words. Indices, on the other hand, organize references to web pages in a hierarchical organization of the web. For example, the user interested in the magic trick in which a volunteer is sawed in half might traverse an index's hierarchy from its root to the node for /entertainment/magic/tricks, where the user would find a list of references to web pages related to various magic tricks.

Search engines and indices have several drawbacks, however. These finding tools require a user to rely on the organizations that maintain them, and could disappear at some point in the future if they become unprofitable. Also, they may not include the newest web pages. Further, index hierarchies commonly exclude many web pages and the categories that describe them. An index provider might exclude pages about sawing a volunteer in half for moral reasons, or because they do not fit neatly into its existing hierarchy.

Once a user has done a great deal of exploration looking for interesting pages, it can be difficult to keep track of the interesting web pages. While some browsers maintain a list of every web page visited, it can be difficult to distinguish interesting pages from uninteresting pages in such a list. Some browsers allow users to indicate, while viewing a web page, that the web page is interesting to them. In response, these browsers store a reference to this page for future use as a bookmark. When later reviewing a list of bookmarks, however, it can be difficult to determine, for a particular bookmark, why the referenced web page was of interest to the user. Some browsers further permit a user to manually construct a folder hierarchy for organizing web page references, and to place references to interesting web pages in the appropriate folders. This requires a significant amount of effort on the user's part, however.

SUMMARY OF THE INVENTION

The invention facilitates sharing, between users, of information about world wide web pages that are useful for users having particular interests. The invention uses a group of distinctive human character models ("characters"), such as "Nancy The Young Republican" and "Presto The Hobbyist Magician," to organize web pages that may be of interest to those users in a group of users sharing the characters' interests. A web page reference sharing and organizing facility ("the facility") maintains a number of characters having different personalities and interests, and associates with each character a list of references to web pages matching its personality and interests. A character's personality and interests are manifested by a body of information stored for the character by the facility. This information preferably includes a descriptive name, such as "Presto the Hobbyist Magician," which gives users an intuitive feel for the character's likely personality and possible interests. The information preferably also includes a narrative paragraph more explicitly outlining the character's personality and interests. The information preferably further includes a picture visually depicting the character, which allows users to quickly and intuitively recognize a character—for example, the facility may store a picture of a magician's hat and wand for the "Presto the Hobbyist Magician" character. Each of the above features of the character help users to develop an expectation about the kind of web pages that appeal to the character, and are or should be on the character's list of accepted web pages. In certain embodiments, the information stored for a character further includes a specification and topics of interest to the character. The facility may maintain an arbitrary number of different characters. A user may select any subset of these characters as his or her "active characters."

The facility maintains, for each character, a list of references to web pages matching the character's interests. The facility assesses each new web page encountered by the user to determine whether to include them in the character's list. Assessed pages are added to a character's list if they exhibit at least a threshold level of similarity to web pages already on the list, or if they discuss one or more topics specified for the character. Adding a web page to a character's list is also known as accepting the web page on the character's behalf. The facility enables users in a group of users to: recommend a web page to a character, view a character's list and a description of the character, visit a web page on the character's list for which there is a link in the current web page, and visit a randomly chosen web page from a character's list. A character that is selected as an active character by multiple users becomes a basis for sharing web page references for web pages relating to the interests of the character. Because the character is updated for pages viewed by each of the users for which it is an active character, and potentially may add to its list pages recommended by each of these users, the users can benefit from each other's explorations. Further, the sharing may be performed in an anonymous manner.

The facility may assess web pages for inclusion in one or more characters' lists in a number of circumstances: when a user recommends the web page to a character; when a user visits the web page; when a user visits another web page containing a link to the web page; and when the facility autonomously visits the web page, employing a mechanism for automatically traversing a group of linked web pages or a search engine to identify possibly related web pages. During the assessment process, the facility compares a measure of the character's preference for new web pages to a configurable threshold for the character, and favors web pages recommended by users for inclusion by a configurable amount. In order to assess a new web page, the facility preferably compares a characterization of the new page's content and/or formatting to characterizations of the content and/or formatting of web pages already on the character's list. If the characterization of the new web page bears at least a threshold level of similarity to the characterizations of the web pages already on the character's list, then the facility includes the new web page in the list. In one embodiment, such characterization involves identifying on the new web page words appearing more frequently on accepted web pages than on all web pages.

The facility preferably characterizes the web pages in a character's list by storing for the character a list of all of the unique words contained by web pages in the character's list. In conjunction with each unique word, the facility stores the number of accepted web pages containing the word, as well as the total number of assessed web pages containing the word. For a given unique word, the extent to which the quotient of the number of accepted web pages containing the word to the number of assessed web pages containing the word exceeds the quotient of the total number of accepted web pages to the total number of assessed web pages is a measure of the character's preference for new web pages containing the unique word. The facility preferably uses this stored data when assessing a new page to calculate the character's quantitative preference for the web page. If this quantitative preference is large enough, the facility adds the new web page to the character's list of web pages.

DETAILED DESCRIPTION OF THE INVENTION

The present invention is directed to sharing and organizing world wide web references using a number of distinctive human character models ("characters") that are each associated with a dynamic set of web pages relating to the character's personality and interests. In a preferred embodiment, a web page reference sharing and organizing facility ("the facility") maintains a number of characters having different personalities and interests, and associates with each character a list of references to web pages matching its personality and interests. A character's personality and interests are manifested by a body of information stored for the character by the facility. This information preferably includes a descriptive name, such as "Presto the Hobbyist Magician," which gives users an intuitive feel for the character's likely personality and possible interests. The information preferably also includes a narrative paragraph more explicitly outlining the character's personality and interests. The information preferably further includes a picture visually depicting the character, which allows users to quickly and intuitively recognize a character—for example, the facility may store a picture of a magician's hat and wand for the "Presto the Hobbyist Magician" character. Each of the above features of the character help users to develop an expectation about the kind of web pages that appeal to the character, and are or should be on the character's list of accepted web pages. In certain embodiments, the information stored for a character further includes a specification and topics of interest to the character. The facility may maintain an arbitrary number of different characters. A user may select any subset of these characters as his or her "active characters."

The facility assesses web pages encountered by the user to determine whether to include them in the character's list. Assessed web pages are added to a character's list if they exhibit at least a threshold level of similarity to web pages already on the list, or if they discuss one or more topics specified for the character. Adding a web page to a character's list is also known as accepting the web page on the character's behalf. The facility enables users in a group of users to: recommend a web page to a character, visit a web page on the character's list for which there is a link in the current web page, and visit a randomly chosen web page from a character's list, view a character's list and a description of the character. A character that is selected as an active character by multiple users becomes a basis for sharing web page references for web pages relating to the interests of the character. Because the character is updated for pages viewed by each of the users for which it is an active character, and potentially may add to its list pages recommended by each of these users, the users can benefit from each other's explorations. Further, the sharing may be performed in an anonymous manner.

The facility may assess web pages for inclusion in one or more characters' lists in a number of circumstances: when a user recommends the web page to a character; when a user visits the web page; when a user visits another web page containing a link to the web page; and when the facility autonomously visits the web page, employing a mechanism for automatically traversing a group of linked web pages or a search engine to identify possibly related web pages. During the assessment process, the facility compares a measure of the character's preference for new web pages to a configurable threshold for the character, and favors web pages recommended by users for inclusion by a configurable amount. In order to assess a new web page, the facility preferably compares a characterization of the new page's content and/or formatting to characterizations of the content and/or formatting of web pages already on the character's list. If the characterization of the new web page bears at least a threshold level of similarity to the characterizations of the web pages already on the character's list, then the facility includes the new web page in the character's list.

Inducting the newest page in the character's list is also known as accepting the newest page on behalf of the character. In one embodiment, such characterization involves identifying on the new web page words appearing more frequently on accepted web pages than on all web pages.

The facility preferably characterizes the web pages in a character's list by storing for the character a list of all of the unique words contained by web pages in the character's list. In conjunction with each unique word, the facility stores the number of accepted web pages containing the word, as well as the total number of assessed web pages containing the word. For a given unique word, the extent to which the quotient of the number of accepted web pages containing the word to the number of assessed web pages containing the word exceeds the quotient of the total number of accepted web pages to the total number of assessed web pages is a measure of the character's preference for new web pages containing the unique word. The facility preferably uses this stored data when assessing a new page to calculate the character's quantitative preference for the web page. If this quantitative preference is large enough, the facility adds the new web page to the character's list of web pages.

Figure 2:
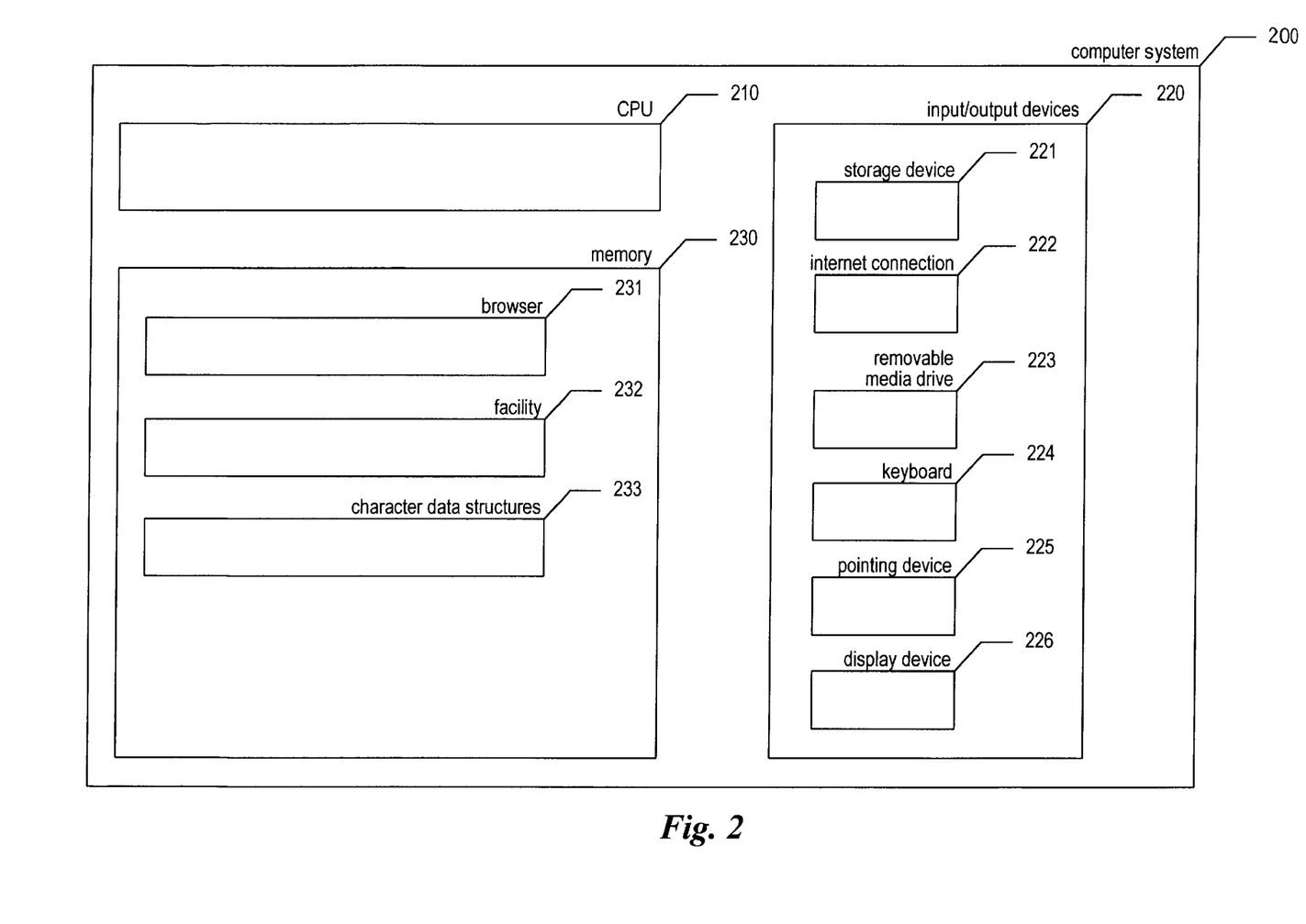
FIG. 2 is a high-level block diagram of the general-purpose computer system upon which the facility preferably operates.

FIG. 2 is a high-level block diagram of the general-purpose computer system upon which the facility preferably operates. The computer system 200 contains a central processing unit (CPU) 210, input/output devices 220, and a computer memory (memory) 230. Among the input/output devices is a storage device 221, such as a hard disk drive. The input/output devices also include an Internet connection 222 enabling the computer system 200 to communicate with other computer systems via the Internet. The input/output devices also include a removable media drive 223, which can be used to install software products, including the facility which are provided on a computer-readable medium, such as a CD-ROM. The input/output devices further include a keyboard 224 for inputting text and command-key sequences; a display device 226, such as a video monitor, for displaying visual information; and a pointing device 225, such as a mouse, for selecting positions on the display device 226. The computer programs that preferably comprise the facility 232 reside in the memory 230 and execute on the CPU 210. The memory 230 preferably also includes a world wide web client, or browser 231 for viewing web pages. The memory 230 also includes character data structures 233 used by the facility 232 to maintain information about each distinctive character used by the facility. While the facility is preferably implemented on a computer system configured as described above, those skilled in the art will recognize that it may also be implemented on computer systems having different configurations.

Figure 3:
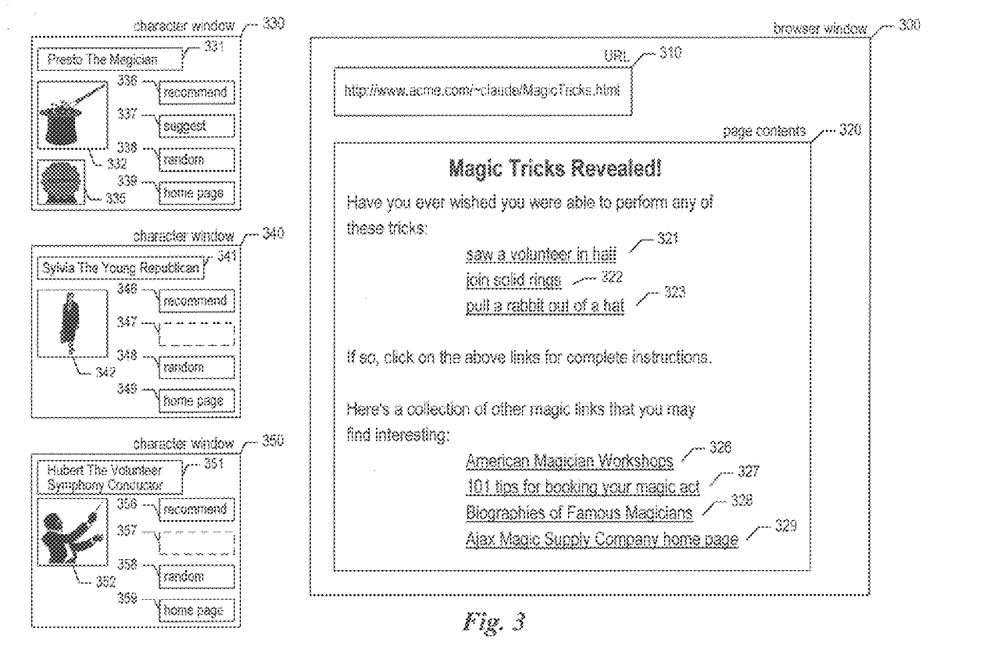
FIG. 3 is a display diagram showing the operation of the facility.

FIG. 3 is a screen diagram showing the operation of the facility. The screen diagram shows a browser window 300 displayed by the browser 231 (FIG. 2). The screen diagram further shows a number of character windows displayed by the facility, including character windows 330, 340, and 350. Each of the character windows corresponds to a single one of the distinctive characters maintained by the facility. While the facility is able to maintain an arbitrarily large number of distinctive characters and display a character window for each of them, a small number of character windows is shown to more clearly illustrate the contents of the character window. Character window 330, for example, is for the character "Presto The Hobbyist Magician." The character window contains the character's name 331 and a visual depiction of the character 332. The character window further contains an acceptance indication 335 that indicates that the character has accepted the current page shown in the browser window. The character window further contains a series of buttons: a recommend button 336 for recommending the current page to the character, a suggest button 337 for viewing an accepted web page that is linked to from the current web page, a random button 338 for viewing a web page randomly selected from the list of web pages accepted by the character, and a home page button 339 for viewing a home page showing further information about the character.

The indication of acceptance 335 and the suggest button 337 are displayed conditionally. The facility only displays an indication of acceptance for a character if the character has assessed and accepted the current page. For example, character window 340 "Sylvia The Young Republican" does not contain an indication of acceptance because the facility has not accepted the current page on behalf of this character. Further, the facility only displays the suggest button for a character when one or more web pages linked to from the current web page have been assessed and accepted by the character. For example, character window 350 for the "Hubert The Volunteer Symphony Conductor" character does not contain a suggest button, as none of the web pages linked to from the current web page have been accepted by this character. Each time the user visits a new web page, the facility assesses the current page and its linked pages with respect to each active character, updates the condition of each character window to reflect the character's acceptance of the current web page, and the character's acceptance of at least one of the web pages linked to from the current web page. For example, if the user viewed a different web page which, when assessed with respect to the active characters, was accepted by the "Sylvia The Young Republican" character and not accepted by the "Presto The Magician" character, the facility would remove the indication of acceptance 335 from the character window 330 "Presto The Magician" and add an indication of acceptance 335 (not shown) to the character window 340 for the "Sylvia The Young Republican" character. In an alternative embodiment, the facility omits to assess web pages linked to from the current web page in order to conserve processing resources, basing its suggestions only on linked-to pages that have been previously accepted. In addition to the visual indications of acceptance of the present and linked-to web pages, the facility may use animation and audio, including synthesized or recorded speech, to indicate a character's acceptance of web pages.

Figure 4:
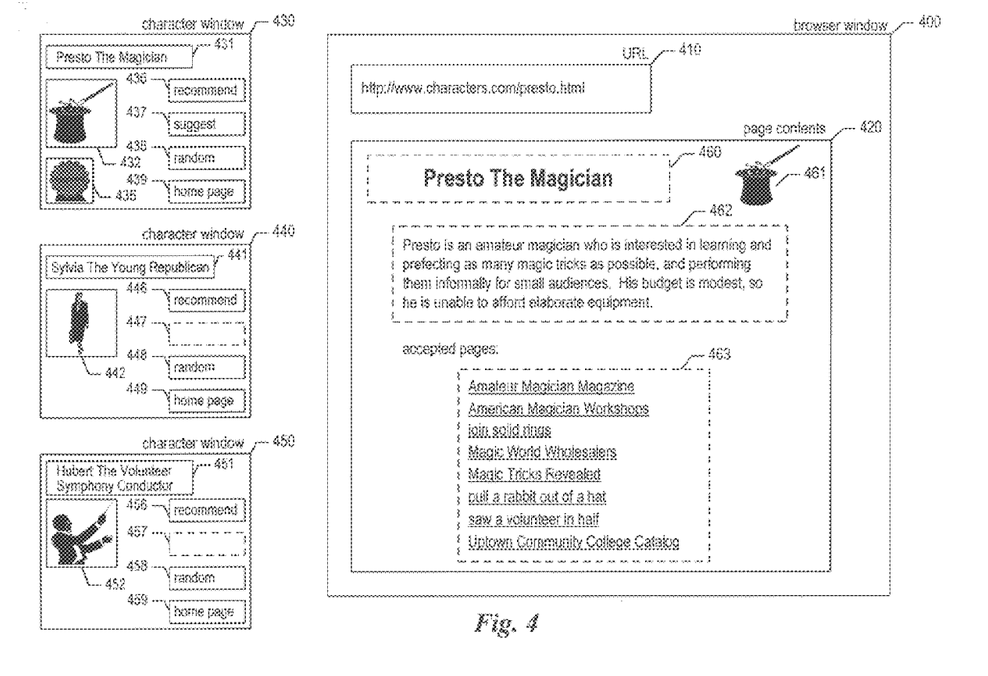
FIG. 4 is a screen diagram showing the display of a character home page.

By pressing the home page button in the character window for a character, the user can cause the facility to display the home page for that character. For example, by pressing the home page button 339 and character window 330 for the character "Presto The Magician," the user can cause the facility to display the home page for this character. FIG. 4 is a screen diagram showing the display of a character home page. It should be noted that character home pages resemble the home pages constructed by human users to describe themselves, and therefore further support the metaphor of characters as human users that share the identity of interesting web pages relating to common interests. The page contents 420 of the home page includes information about the character useful to the user. The page contents include the name of the character 460, a visual representation of the character 461, a narrative statement describing the character and the character's interests 462, and a list of web pages accepted by the character 463. The user may select any of the accepted web pages 463 in order to visit those pages directly. A character's home page may additionally order the list of accepted web pages by their page ratings (i.e., the measure of the character's preference for them), or in decreasing order of their recency of acceptance (not shown).

Figure 5A:
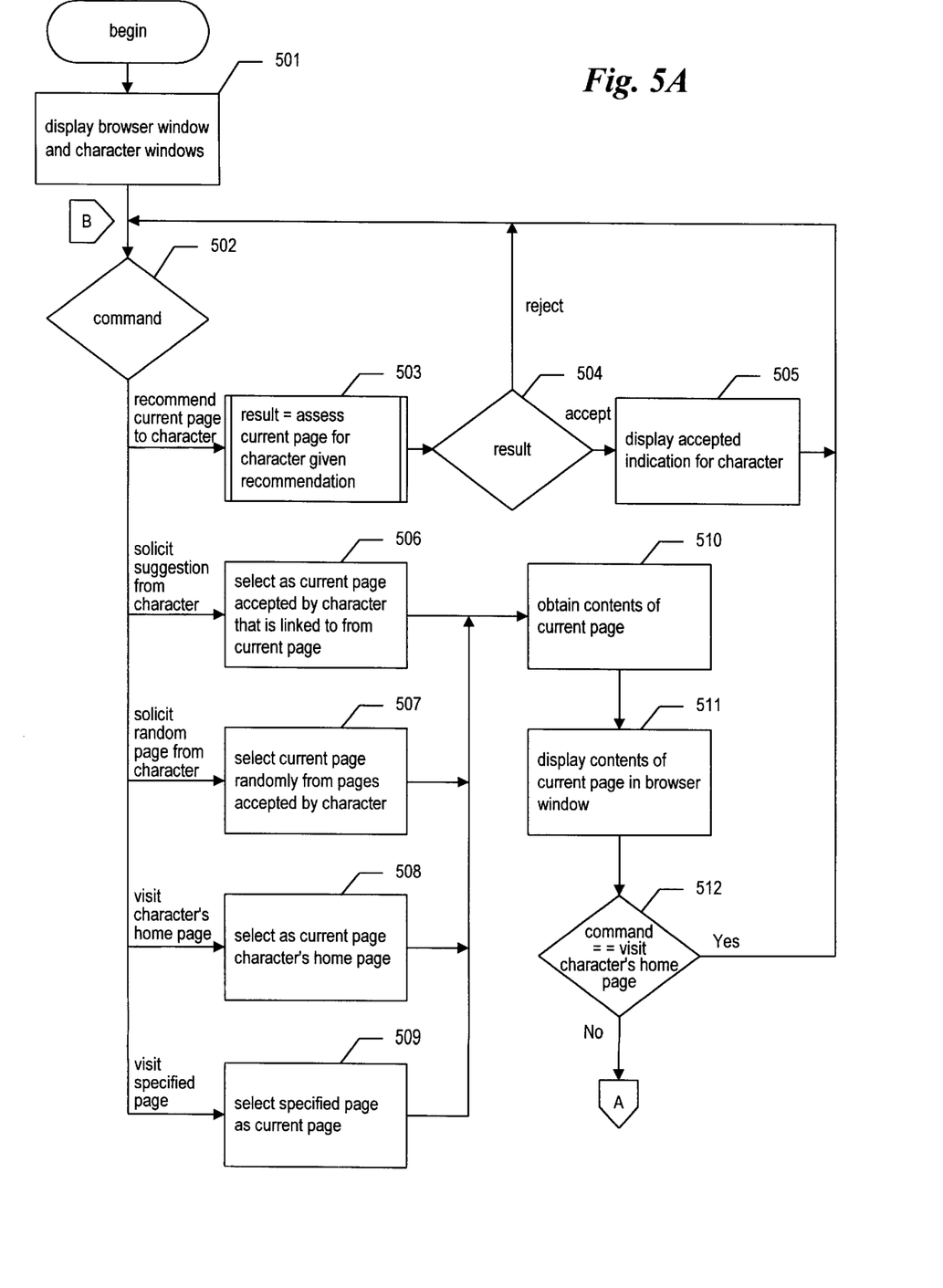
FIGS. 5A–5B contain a flow diagram illustrating the operation of the facility.
Figure 5B:
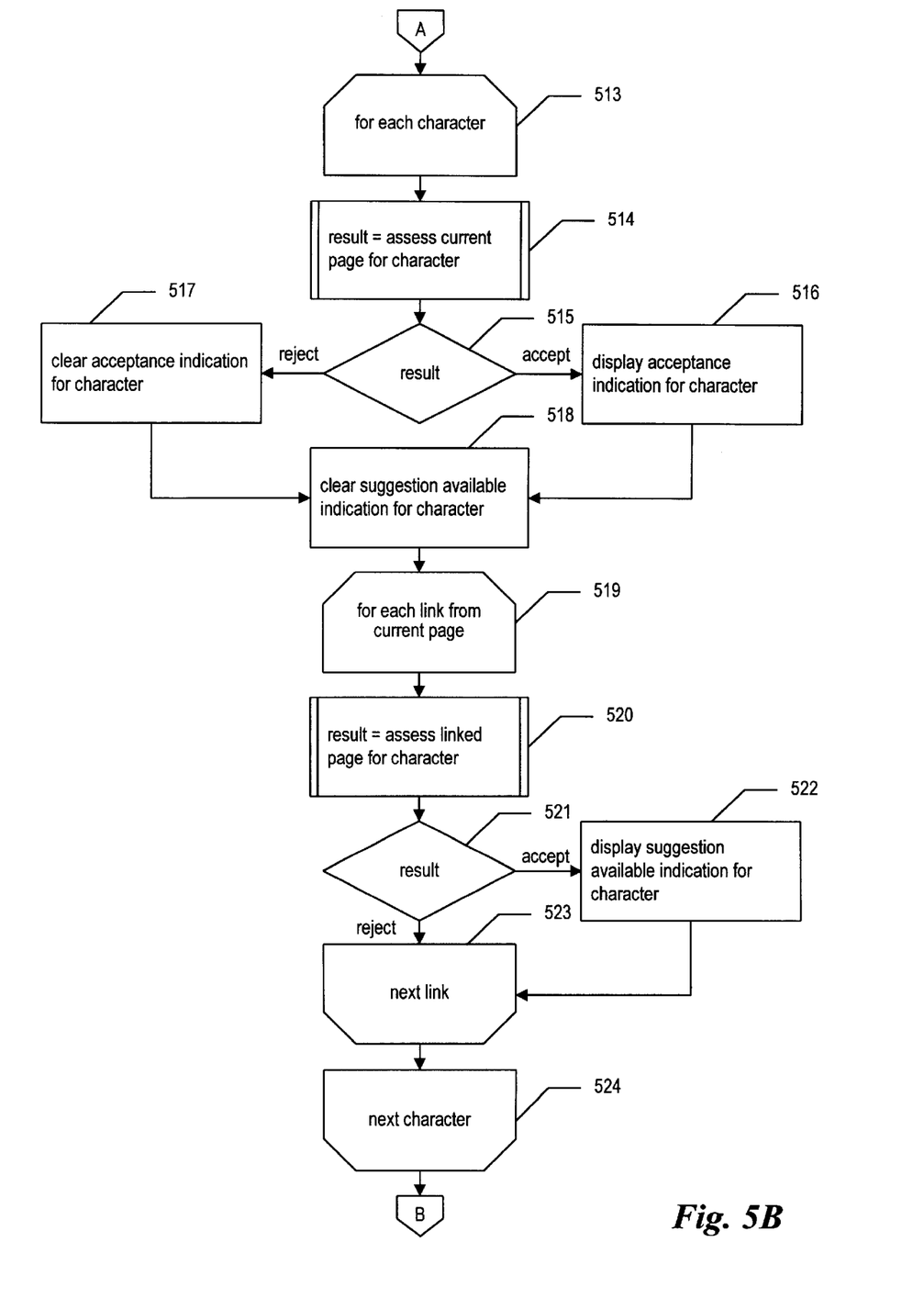

FIGS. 5A–5B contain a flow diagram illustrating the operation of the facility. In step 501, the facility displays the browser window and character windows for each window in use by the current user. To this end, the facility preferably stores for each user a list of active characters being used by the user (not shown). The user may preferably customize this list at any time to remove existing characters or add additional characters. After step 501, the facility continues in step 502. In step 502, the facility receives one of several types of commands. If the received command is to recommend the current page to a particular character, then the facility continues at step 503, else if the receive command is to solicit a suggestion from a specified character, then the facility continues at step 506, else if the receive command is to solicit a random web page from the character, then the facility continues in step 507, else if the receive command is to visit the character's home page, then the facility continues in step 508, else the command is to visit a specified page and the facility continues in step 509. In step 503, in response to the command to recommend the current page to a specified character, the facility invokes a routine to assess the current web page for the specified character in light of the recommendation. This routine is discussed in greater detail below in conjunction with FIG. 6. The facility stores the result of the assessment operation in a "result" variable. In step 504, if the result variable indicates that the result of the assessment operation was the acceptance of the web page by the character, then the facility continues in step 505 to display an indication of acceptance for the character. The facility then continues at step 502 to receive the next command.

In step 506, in response to the command to solicit a suggestion from the character, the facility selects as the current web page a web page accepted by the character that is linked to from the current page. After step 506, the facility continues in step 510.

In step 507, in response to the command to solicit a random web page from a specified character, the facility selects the current page randomly from the pages accepted by the specified character. After step 507, the facility continues at step 510.

In step 508, in response to the command to visit a specified character's home page, the facility selects as the current page the home page of the specified character. As part of step 508, the facility updates the contents of the character's home page, discussed above in conjunction with FIG. 4, to reflect the current list of accepted pages for the character (not shown). After step 508, the facility continues in step 510.

In step 509, in response to the command to visit a specified web page, the facility selects the specified page as the current page. After step 509, the facility continues in step 510.

In step 510, the facility obtains the contents of the current page using the browser. In step 511, the facility displays the contents of the current page in the browser window. In step 512, if the command received in step 502 was to visit a specified character's home page, then the facility continues in step 502 to receive the next command, else the facility continues through junction A at step 513.

In steps 513–524, the facility loops through each character being used by the user to assess the current web page and web pages linked to from the current web page. In step 514, the facility assesses the current web page with respect to the character, as discussed further below in conjunction with FIG. 6. The facility stores the result of its assessment operation in a result variable. In step 515, if the value of the result variable indicates that the result of the assessment operation was that the character accepted the current web page, then the facility continues at step 516, else the result of the assessment operation was that the facility rejected the current web page and the facility continues at step 517. In step 516, the facility displays an acceptance indication in the character window for the current character to indicate that the current web page was accepted by the character. After step 516, the facility continues in step 518. In step 517, the facility clears the indication of acceptance from the character window for the current character. In step 518, the facility removes the suggestion button from the character window for the current character. In steps 519–523, the facility loops through each link from the current web page to assess the linked web page. In step 520, the facility assesses the linked web page with respect to the current character, and stores the result in a result variable. In step 521, if the value of the result variable indicates that the result of the assessment operation wants to accept the web page on behalf of the character, then the facility continues in step 522, else the facility continues in step 523. In step 522, the facility displays the suggest button in the character window for the current character. In step 523, the facility loops back to step 519 to process the next link on the current page. In step 524, the facility loops back to step 513 to process the next character. After step 524, the facility continues through junction B at step 502 to process the next command. In this way, the facility processes each received command.

Figure 6:
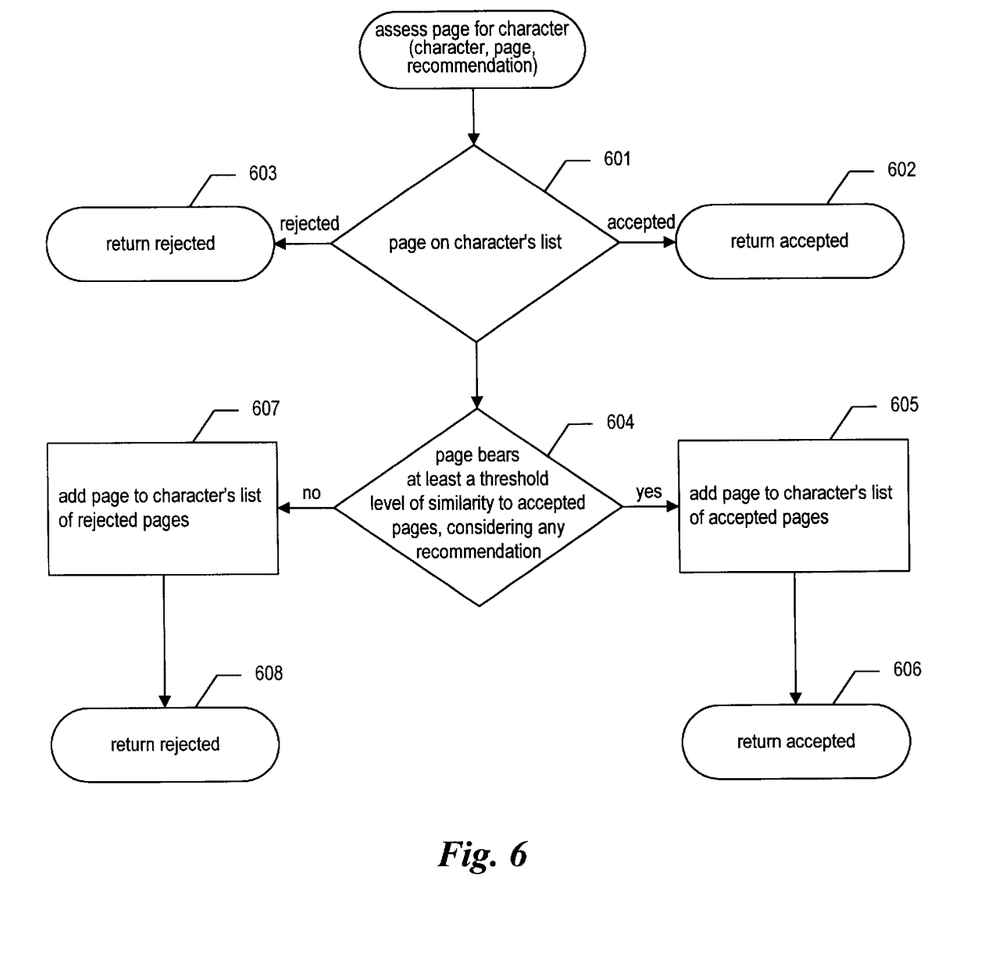
FIG. 6 is a flow diagram showing the routine preferably used by the facility to assess a web page for a specified character.

FIG. 6 is a flow diagram showing the routine preferably used by the facility to assess a web page for a specified character. These steps use the identity of the specified character, the contents of the page to be assessed, and an indication of whether the assessment is to be performed in accordance with a recommendation from the user or without such a recommendation. In steps 601–603, the facility omits to assess the web page for the character if the web page has already been accepted or rejected for the character, in order to conserve processing resources. In step 601, if the web page is on the list of web pages already accepted for the character, then the facility continues in step 602 to return the result that the web page has been accepted on behalf of the character. If the web page is on the list of web pages rejected by the character, then the facility continues in step 603 to return the result that the web page is rejected on behalf of the character. If the web page is on neither the list of accepted pages or the list of rejected pages for the character, then the facility continues in step 604. An alternative preferred embodiment omits steps 601–603 in order to evaluate every encountered web page regardless of its earlier acceptance or rejection. While this alternative embodiment consumes more processing resources, it enables the facility to reassess pages that may have changed since they were earlier rejected, or that have become acceptable based on changes to the character's interests resulting from the character's intervening acceptance of other web pages.

In step 604, if a page bears at least a threshold level of similarity to the web pages on the list of web pages accepted for the character, considering the user's recommendation if the assessment is subject to a user recommendation, then the facility continues in step 605, else the facility continues in step 607. In step 605, the facility adds the page to the list of web pages accepted by the character. The performance of step 604 is discussed in greater detail below. In step 606, the facility returns the result that the web page was accepted by the character. In step 607, the facility adds the web page to the list of web pages rejected by the character. In step 608, the facility returns the result that the web page was rejected by the character.

In order to determine whether a web page being assessed bears at least a threshold level of similarity to web pages accepted by the character, the facility preferably maintains information characterizing the web pages accepted by the character. This data can be seen within the data structure maintained by the facility for each character.

Figure 7:
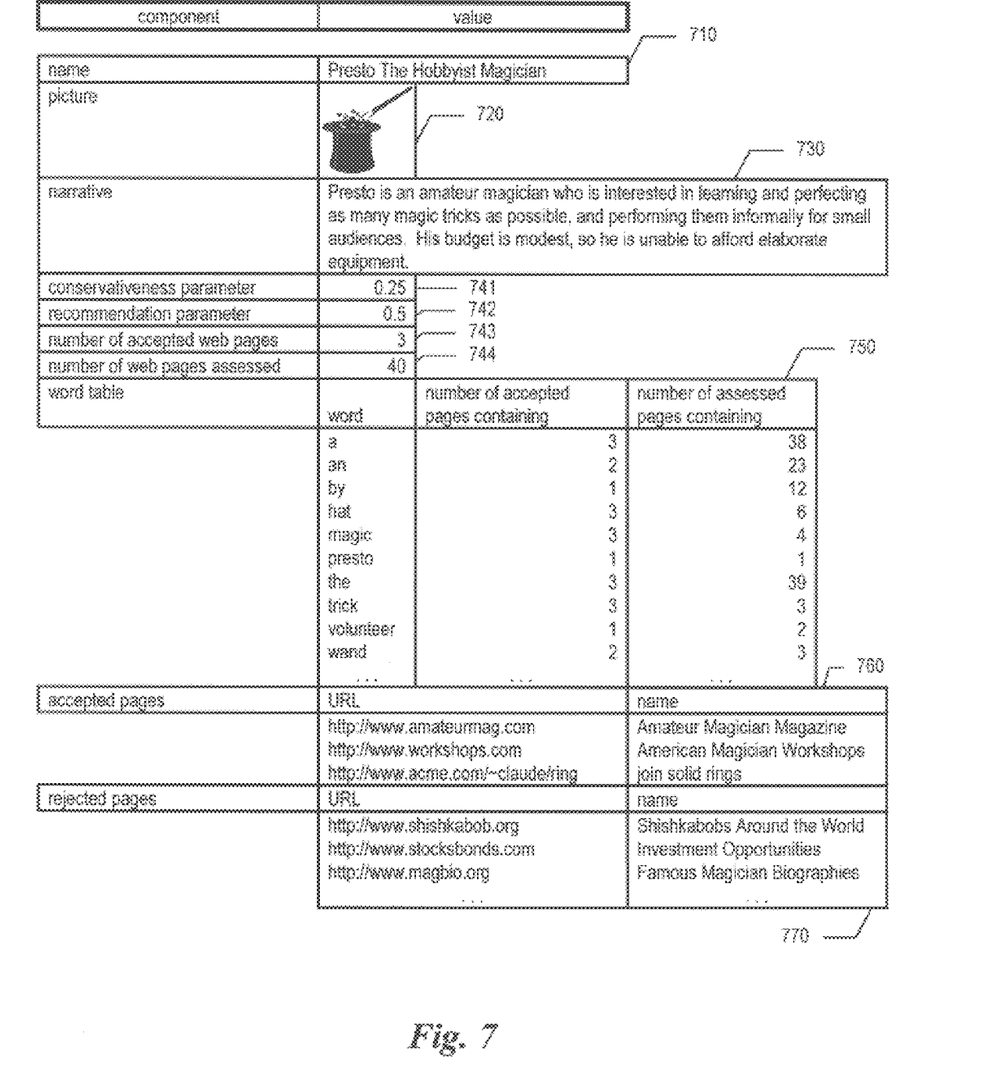
FIG. 7 is a data structure diagram showing the data structure preferably maintained by the facility for each character.

FIG. 7 is a data structure diagram showing the data structure preferably maintained by the facility for each character. The contents of the data structure are stored when the character is first created, and are updated to reflect the web pages accepted and rejected for the character. The contents preferably may be revised by a user at any time to adjust the performance of the character. The data structure contains the name of the character 710, a visual representation of the character or picture 720, and a narrative description of the character 730. The data structure further contains an conservativeness parameter 741 and a recommendation parameter 742 used in the assessment operation. The conservativeness parameter 741 controls the reluctance of the character to accept new web pages, and may range between zero and one. The higher the conservativeness parameter for a character, the less likely the character is to accept a new page. The recommendation parameter 742 also ranges from zero to one, and controls the amount of deference given in accepting web pages recommended by a user. The larger the recommendation parameter, the more likely the character is to accept a web page recommended by a user. The conservativeness parameter and recommendation parameter may preferably be configured by the users to optimize the performance of a particular character. The data structure further includes counters of the number of accepted web pages 743 and the number of web pages assessed 744. The data structure further contains a word table 750. The word table contains a list of all the unique words occurring in the web pages assessed for the character. For each such word, the word table contains the number of accepted pages containing the word, and the number of assessed pages containing the word. As an indicator of the acceptability of a new page, the facility considers for each word on a new page the ratio of the number of accepted pages containing a word to the number of accessed pages containing the word. The character data structure further contains a list of pages accepted by the character 760, as well as a list of the pages rejected by the character 770. By utilizing the list of the pages rejected by the character, the facility is able to avoid reassessing the acceptability of pages already rejected by the character, thus operating more efficiently. In a preferred embodiment, however, the list of rejected pages is omitted in order to reassess pages that may have changed since they were earlier rejected, or that have become acceptable based on the character's intervening acceptance of other web pages.

The conservativeness parameter, recommendation parameter, number of accepted web pages, number of web pages assessed, and word table stored for a particular character are used by the facility to assess the acceptability of a page with respect to the character using Conditional Inequality (1) below to determine whether to accept a particular web page:

$$(\text{page rating}) + (\text{recommended}) \times (\text{recommendation parameter}) \times (1 \times (\text{page rating})) \leq (\text{page acceptance rate}) + (\text{conservativeness parameter}) \times (1 - (\text{page acceptance rate})) \quad (1)$$

The determination is based on a (page rating) term, which gauges the similarity of the assessed page to pages already accepted for the character. In cases in which the web page was recommended by a user, the (page rating) term is augmented by a term that is weighted by the character's recommendation parameter to increase the likelihood that the page will be accepted. This augmented page rating is compared to the rate at which the facility has accepted the pages it has assessed (page acceptance rate), which is augmented by an extra level of conservativeness (conservativeness parameter)×(1−(page acceptance rate) corresponding to the conservativeness parameter for the character. Thus, Conditional Inequality (1) is satisfied, and the assessed page is accepted for the character, when the page rating and recommendation parameter are relatively high, and the page acceptance rate and conservativeness parameter are relatively low.

Equation (2) below shows the calculation of the (page acceptance rate) term:

$$(\text{page acceptance rate}) = \frac{(\text{number of pages accepted})}{(\text{number of pages assessed})} \quad (2)$$

The (page acceptance rate) term is the quotient of the number of pages accepted 743 to the number of web pages assessed 744. This equation reflects a percentage of assessed pages that are accepted, and forms the fundamental threshold for accepting a page. For the "Presto The Hobbyist Magician" character, the (page acceptance rate) term is equal to 3/40 or 0.075. The calculation of the (page rating) term is shown in Equation (3) below:

$$(\text{page rating}) = 1 - \prod_{\substack{\text{all words} \\ w \text{ in page}}} (1 - (\text{word acceptance rate}(w))) \quad (3)$$

The value of the (page rating) term is a measure of the similarity of the assessed page to the accepted pages, and falls in a range between zero and one. A page rating of zero corresponds to the minimum basis for accepting a page, and a page rating of one corresponds to the maximum basis for accepting a page. The page rating is calculated by subtracting from one a product of terms for each unique word w in the page being assessed. The product terms are each the difference between one and an acceptance rate for the word. For pages containing mostly words having a high occurrence rate, the "page rating" term has a value close to one.

Equation (4) below shows the calculation of the acceptance rate for a word w:

$$\text{(word acceptance rate}(w)) = \frac{\text{(number of accepted pages containing } w)}{\text{(number of assessed pages containing } w)} \quad (4)$$

It can be seen from Equation (4) that the (word acceptance rate(w)) for word w is the quotient of the number of accepted pages containing the word w divided by the number of assessed pages containing the word w. Thus, words that occur mostly on accepted pages have a high award acceptance rate, which increases the page rating of pages on which the word w appears, and makes these pages more likely to be accepted. For example, it can be seen from word table 750 (FIG. 7) that, for the "Presto The Hobbyist Magician" character, the word "trick" is contained on three accepted pages and three assessed pages, giving it a word acceptance rate of one, the maximum word acceptance rate. Given these definitions of terms, the facility uses Conditional Inequality (1) to determine whether to accept a page being assessed.

In an alternative preferred embodiment, the value of the (page rating) term is instead determined by using a natural language parser to determine the extent to which the web page being assessed discusses one or more topics of interest specified for the character.

While the present invention has been shown and described with reference to preferred embodiments, it will be understood by those skilled in the art that various changes or modifications in form and detail may be made without departing from the scope of the invention. For example, varying approaches may be applied to determine whether a web page being assessed bears at least a threshold level of similarity to accepted pages and should be accepted. This determination can be made using alternative techniques, including lexicon clustering, pattern matching, or natural language abstraction. Further, the facility may either be implemented as part of a browser or in conjunction with an autonomous browser. Browsers used with the facility may themselves be autonomous applications, or may be integrated into other applications or the operating system. The facility may be used to share and organize web pages not accessible via the Internet, and may in fact be used to share and organize documents other than web pages. The facility need not rely on the user to visit pages in order to assess them, but rather may autonomously identify web pages using for example, a mechanism that repeatedly follows links, indices, and/or search engines.

What is claim is:

1. A method in a computer system for organizing references to web pages for a plurality of users using a plurality of lists of web pages, the web pages in each list reflecting common subject matter, each list having a threshold similarity value indicating the degree of similarity that a visited page must bear to web pages in the list in order to be included in the list, the method comprising the steps of:

determining that any of the plurality of users is visiting a web page;

in response to the determining step:

for each list of web pages:

comparing the contents of the visited web page to the contents of the web pages included in the list of web pages to assess the level of similarity between the contents of the visited web page and the contents of the web pages included in the list of web pages;

if the level of similarity between the contents of the visited web page and the contents of the web pages included in the list of web pages exceeds the threshold value for the list, including the visited web page in the list of web pages;

receiving from any of the users for an identified list a recommendation of an identified page;

in response to the receiving step:

comparing the contents of the identified web page to the contents of the web pages included in the identified list of web pages to assess the level of similarity between the contents of the identified web page and the contents of the web pages included in the identified list of web pages;

deriving from the assessed level of similarity a modified level of similarity reflecting the received recommendation; and if the modified level of similarity between the contents of the identified web page and the contents of the web pages included in the identified list of web pages exceeds the threshold value for the identified list, including the identified web page in the identified list of web pages.

2. The method of claim 1 wherein the steps of comparing a web page to the web pages in a list include the steps of:

computing, for each unique word in the web page, the fraction of web pages on the list that contain the word divided by the number of visited web pages that contain the word; and combining the computed fractions to obtain an assessed level of similarity between the web page and the web pages on the list.

3. The method of claim 1, further including the step of varying the threshold similarity value for one of the lists of web pages in response to user input.

4. The method of claim 1, further including the steps of:

displaying a visual indication of each of the lists of web pages; and indicating in conjunction with the displayed visual indication of each of the lists of web pages whether the visited web page is included in the list.

5. The method of claim 4 wherein the displaying step displays, for each list of web pages, information about a distinctive character reflecting the common subject matter of the web pages in the list.

6. The method of claim 1, further including the steps of:

displaying a visual indication of each of the lists of web pages;

receiving user input selecting the displayed visual indication of a selected one of the lists of web pages; and in response to the receiving step, displaying the contents of the selected list of web pages and information describing the selected list.

7. The method of claim 6 wherein the displaying step displays, for each list of web pages, information about a distinctive character associated with the common subject matter of the web pages in the list.

8. The method of claim 1, further including the steps of:

displaying a visual indication of each of the lists of web pages;

receiving user input selecting the displayed visual indication of a selected one of the lists of web pages; and in response to the receiving step, causing the user to visit one of the web pages included in the selected list of web pages.

9. The method of claim 8 wherein the displaying step displays, for each list of web pages, information about a distinctive character associated with the common subject matter of the web pages in the list.

10. A method in a computer system for organizing web pages viewed by a user in accordance with a plurality of distinctive characters each having an interest, the method comprising the steps of:

initializing each character by associating with each character one or more web pages that collectively characterize the interest of the character, such that a predetermined threshold level of similarity associated with the character exists based on the one or more web pages associated therewith; and for each web page visited by the user, for each character in the plurality of characters, determining whether the visited web page exhibits at least the threshold level of similarity to web pages already associated with the character, and if the viewed web page exhibits at least the threshold level of similarity to the web pages already associated with the character, associating the visited web page with the character, such that, after the user has viewed a number of web pages, the visited web pages that characterize each character's interest are associated with that character.

11. The method of claim 10 wherein the step of associating the viewed web page with the character includes the step of storing a reference to the viewed web page in a list associated with the character.

12. The method of claim 11, further comprising the steps of:

receiving user input selecting one of the characters;

displaying the references to web pages contained in the list associated with the selected character; and in response to user input selecting one of the displayed web page references, displaying the contents of the web page referred to by the selected web page reference.

13. The method of claim 12, further including the steps of:

receiving user input selecting a follow-random-reference command with respect to a selected character;

without regard for further user input, selecting a web page reference from the list associated with the selected character; and in response to the step of selecting a web page reference, displaying the contents of the web page referred to by the selected web page reference.

14. A method in a computer system for identifying linked web pages approved for inclusion in a group of web pages, the method comprising the steps of:

receiving input from a user selecting a web page;

retrieving the contents of the selected web page, including one or more links to additional web pages;

retrieving, without selection by the user, the contents of each additional web page;

for each additional web page, if the retrieved contents of the additional web page bear at least a threshold similarity to web pages among the group of web pages, adding the additional web page to the group of web pages;

after the adding step, for each additional web page, determining whether the additional web page is among the group of web pages; and displaying an indication in conjunction with the displayed contents of the selected web page that at least one additional web page is among the group of web pages.

15. The method of claim 14, further comprising the step of, in response to user input selecting the displayed indication that at least one of the additional web pages is among the group of pages, presenting the contents of one of the additional web pages that is among the group of pages.

16. The method of claim 14 wherein the step of displaying an indication includes the step of:

displaying the retrieved contents of the selected web page such that each link to an additional web page determined to be among the group of pages is displayed in a manner that distinguishes it from links to additional web pages not among the group of pages.

17. A computer-readable medium whose contents cause a computer system to identify linked documents approved for inclusion in a group of documents by performing the steps of:

receiving input from a user selecting a document;

retrieving the contents of the selected document, including one or more links to additional documents;

retrieving, without selection by the user, the contents of each additional document;

for each additional document if the retrieved contents of the additional document bear at least a threshold similarity to documents among the group of documents, adding the additional document to the group of documents;

after the adding step, for each additional document, determining whether the additional document is among the group of documents; and displaying an indication in conjunction with the retrieved contents of the selected document that at least one additional document is among the group of documents.

* * * * *